US008533940B2

(12) United States Patent
Kawell et al.

(10) Patent No.: US 8,533,940 B2
(45) Date of Patent: Sep. 17, 2013

(54) ANGLED WIRE CRIMPING TOOL

(75) Inventors: Michael Kawell, Elko, MN (US); Dirk C. Skogerboe, Faribault, MN (US); Larry Betcher, Northfield, MN (US)

(73) Assignee: Service Solutions U.S. LLC, Warren, MI (US)

( * ) Notice: Subject to any disclaimer, the term of this patent is extended or adjusted under 35 U.S.C. 154(b) by 120 days.

(21) Appl. No.: 13/034,429

(22) Filed: Feb. 24, 2011

(65) Prior Publication Data

US 2012/0216399 A1 Aug. 30, 2012

(51) Int. Cl.
*B23P 19/00* (2006.01)

(52) U.S. Cl.
USPC .............. 29/751; 29/753; 29/758; 72/409.13; 72/409.14

(58) Field of Classification Search
USPC ................ 29/750, 751, 753, 758; 72/409.13, 72/409.14
See application file for complete search history.

(56) References Cited

U.S. PATENT DOCUMENTS

| | | | | |
|---|---|---|---|---|
| 5,138,864 | A * | 8/1992 | Tarpill | 72/409.12 |
| 5,195,352 | A * | 3/1993 | Grois et al. | 72/409.16 |
| 5,842,371 | A * | 12/1998 | Liaw | 72/409.12 |
| 5,845,393 | A * | 12/1998 | DePaiva | 29/751 |
| 5,924,322 | A * | 7/1999 | Caveney | 72/409.14 |
| 6,112,404 | A * | 9/2000 | Tarpill | 29/751 |
| 6,199,458 | B1 * | 3/2001 | Wrigley et al. | 81/319 |
| 6,253,449 | B1 * | 7/2001 | Chen | 29/751 |
| 7,040,007 | B2 * | 5/2006 | Shutts et al. | 29/751 |
| 7,814,646 | B2 * | 10/2010 | Tarpill et al. | 29/751 |

* cited by examiner

*Primary Examiner* — Carl Arbes
(74) *Attorney, Agent, or Firm* — Baker & Hostetler LLP

(57) ABSTRACT

A crimping tool having an angled crimping portion and a method to use the crimping tool are provided. The angled crimping portion can be angled relative to the crimping tool handle or pivoting portion. The angled crimping portion can also be replaceable with various angled crimping portion having various angles. The angled crimping portion is also adjustable at different angles as needed by the user.

18 Claims, 4 Drawing Sheets

ANGLED WIRE CRIMPING TOOL

FIELD OF THE INVENTION

The present invention relates generally to a wire crimping tool. More particularly, the present invention relates to an angled wire crimping tool.

BACKGROUND OF THE INVENTION

Vehicles such as automobiles, trucks, planes, boats and trains have wiring harnesses in them. The wiring harness provides various functions including communications, power, control and electrical connections. Wire crimping tools having a straight crimping portion are used to service the wiring harness when a wire needs to be replaced or new connections made. In essence, the crimping tool can be used to remove insulations and to connect two or more wires together. The wiring harness, however, may be located in certain parts of the vehicle that are difficult to access. In cases where the wiring harness is difficult to reach, a crimping tool having a straight crimping portion may not work or is difficult to use to service the wiring harness. Accordingly, it is desirable to provide have a crimping tool having an angled crimping portion.

SUMMARY OF THE INVENTION

The foregoing needs are met, to a great extent, by the present invention, wherein in some embodiments an angled crimping tool having an angled crimping portion is provided. The crimping tool may have replaceable or adjustable angled crimping portions.

In accordance with one embodiment of the present invention, a crimping tool is provided, which can comprise a first and second handle located at a first end of the crimping tool, a pivoting portion coupling the first and second handles together, and an angled crimping portion at a second end of the crimping tool, the angled crimping portion having an angle relative to an axis of the pivoting portion.

In accordance with another embodiment of the present invention, a crimping tool is provided, which can include a first and second handle means located at a first end of the crimping tool, a pivoting means configured to couple the first and second handle means together, and an angled crimping means located at a second end of the crimping tool, the angled crimping means configured to have an angle relative to an axis of the pivoting means.

In accordance with yet another embodiment of the present invention, a method of crimping a connector, which can include selecting a crimping tool having an angled crimping portion, placing the angled crimping portion with the connector, and crimping the connector with the angled crimping portion.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
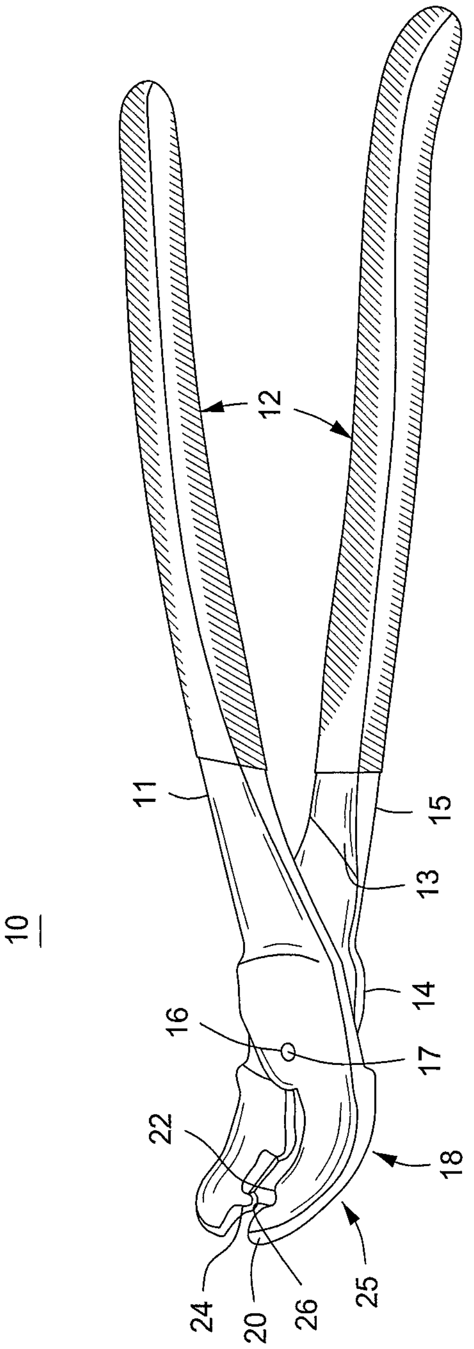
FIG. 1 illustrates a wire crimping tool having an angled crimping portion.

The invention will now be described with reference to the drawing figures, in which like reference numerals refer to like parts throughout. Embodiments in accordance with the present invention provide a wire crimping tool having an angled crimping portion and a method to service wire connections using the angled crimping portion. The wire crimping tool can be used to crimp different gauges of wire including 10 to 22 gauges. In other embodiments, the wire crimping tool can be used to crimp wire terminals.

FIG. 1 illustrates a wire crimping tool 10 having an angled crimping portion 25. The wire crimping tool 10 includes a first body 11, a second body 15, a handle portion 12, a pivoting portion 14, a pivot point 16, and the angled crimping portion 25. The wire crimping tool 10 may be made of any materials including steel, aluminum, and tin. The material chosen should be of a material of sufficient strength for the intended purpose of the wire crimping tool 10.

The handle portion 12 is at one end of each of the bodies 11, 15 of the wire crimping tool 10 and is configured to interact with a user's hand. The handle portion's width may be larger than the rest of the wire crimping tool. The handle portion 12 may include an elastomeric covering to provide a better grip to the user's hand during use. The length of the elastomeric may be as long as the handle portion 12 or as short as desired by the user. The elastomeric covering can be any color and can be used to color code different crimping tools having, for example, different angles of the angled crimping portion 25. Red can be used to let the user know that the crimping angle is 45 degrees, while blue can be used to signify the crimping angle being 60 degrees and so on. The second body 15 includes a stop 13 so that the first body 11 does not slide past the second body 15 during use. Alternatively, the stop 13 can also be placed on first body 11 for the same purpose.

The pivoting portion 14 includes the pivot point 16, which is where the two bodies 11, 15 of the crimping tool are coupled together. This allows portions of the two bodies 11, 15 to pivot away from each other or to engage each other during use of the tool. The pivot point 16 includes a pivot pin 17 where the bodies rotate or pivot in relation to each other.

The angled crimping portion is constructed and designed to crimp and/or strip insulated and non-insulated terminals. The angled crimping portion 25 may include a first angled portion 18 and a second angled portion 20. The first and second angled portions 18, 20 are angled in relation to the first and second bodies 11, 15 or the pivoting portion 14. The first angled portion 18 can be angled at any degree in relation to the first and second bodies 11, 15 or pivoting portion including from about 1 to 120 degrees. The second angled portion 20 can be angled in relation to the first and second bodies 11, 15, or the pivoting portion or the first angled portion 18 handle including from about 1 to 120 degrees. In various embodiments, the first and second angled portions 18, 20 can be in the same or different angles from each other. By having the first and second angled portions 18, 20 at various angles allow for more flexibility to use the wire crimping tool in various hard to reach places. Alternatively, the angled crimping portion 25 is one piece. That is the angled crimping portion is one continuous portion. Further, the angled crimping portion can be formed as one piece with the respective first and second bodies 11, 15. That is the first end of the bodies 11,15 is relative flat and the second end is bent at angle relative to the first end.

In one embodiment, the first angled portion 18 is at the same angle as the first and second bodies 11, 15, or pivoting position and the second angled portion 20 may be between about 1 to 120 degrees. By being angled at these degrees, wires that are unreachable or hard to reach with a straight crimping portion are easier to reach and easier to work with.

The second angle portion 20 includes a working portion 22. The working portion 22 includes a teeth 24 and a receiving portion 26. The connector or wire can be inserted between the teeth 24 and receiving portion 26 in order to be serviced. The teeth 24 and receiving portion 26 are constructed and designed to mate with each other. The working portion 22 can be used to remove insulation from the wire or to connect two or more wires together. There can be different teeth 24 and different receiving portion 26 as needed and the teeth and receiving portion may be of different sizes, shapes and features. The amount of teeth 24 and receiving portion 26 in the working portion can be as much as or as little as desired.

Figure 2:
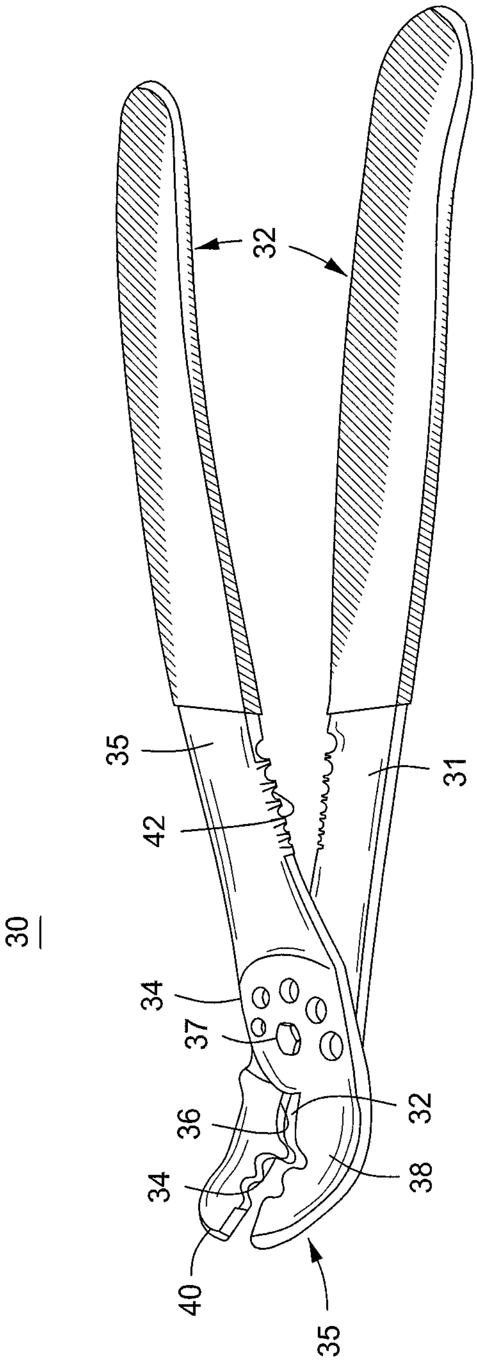
FIG. 2 illustrates a wire crimping tool according to another embodiment of the invention.

FIG. 2 illustrates a wire crimping tool 30 according to another embodiment of the invention. The wire crimping tool 30 includes a first body 31, a second body 35, a handle portion 32, a pivoting portion 34, a pivot point (not shown), the angled crimping portion 35.

The handle portion 32 is at one end of each of the bodies 31, 35 of the wire crimping tool 30 and is configured to interact with a user's hand. The handle portion 32 may include an elastomeric covering to provide a better grip to the user's hand during use. The length of the elastomeric may be as long as the handle portion 32 or as short as desired by the user. The elastomeric covering can be any color and can be used to color code different crimping tools having, for example, different angles of the angled crimping portion as discussed herein. The bodies 31, 35 may include a stripping portion 42 that includes holes formed when the bodies are pressed towards each other. The holes are sized for different gauges of wire. Markings of the gauge sizes may be marked next to the respective holes.

The pivoting portion 34 includes the pivot point (not shown), which is where the two bodies 31, 35 of the crimping tool 30 are coupled together. This allows portions of the two bodies 31, 55 to pivot away from each other or to engage each other during use of the tool. The pivot point includes a pivot pin 37 where the bodies rotate or pivot in relation to each other.

The angled crimping portion 35 may include a first angled portion 38 and a second angled portion 40. The first and second angled portions 38, 40 are angled in relation to the first and second bodies 31, 35, or the pivoting position 34. The first angled portion 38 can be angled at any degree in relation to the first and second bodies 11, 15 including from about 1 to 120 degrees. The second angled portion 40 can be angled in relation to the first and second bodies 31, 35, or the pivoting position 34, or the first angled portion 18 handle including from about 1 to 120 degrees. In various embodiments, the first and second angled portions 38, 40 can be in the same or different degrees from each other. By having the first and second angled portions 38, 40 at various angles allows for more flexibility to use the wire crimping tool in various hard to reach places In one embodiment, the first angled portion 38 is at the same angle as the first and second bodies 31, 35, or the pivoting position 34, and the second angled portion 40 may be between about 60 to 90 degrees. By being angled at these degrees wires that are unreachable or hard to reach with a straight crimping portion are easier to reach and easier to work with.

The second angle portion 40 includes a working portion 32. The working portion 32 includes teeth 34 and receiving portions 36. The wire or the connector can be inserted between the teeth 34 and receiving portions 36 in order to be serviced. The teeth 34 and receiving portion 36 are constructed and designed to mate with each other. The working portion 32 can be used to remove insulation from the wire or to connect two or more wires together. There can be different teeth 34 and different receiving portion 36 as needed and the teeth and receiving portion may be of different sizes, shapes and features. The amount of teeth 34 and receiving portion 36 can be as much as or as little as desired.

Figure 3:
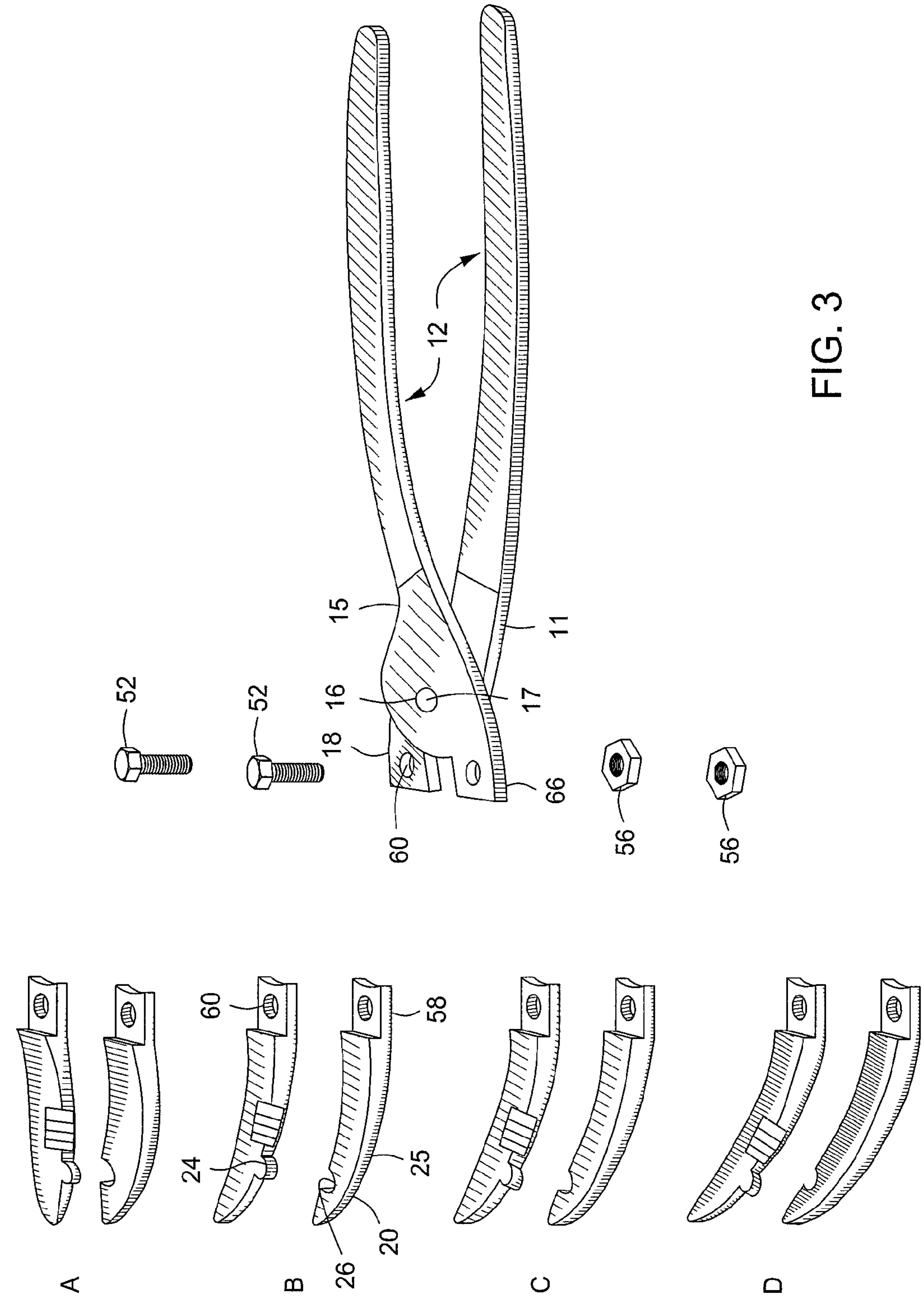
FIG. 3 illustrates the wire crimping tool having a replaceable angled crimping portion according to an embodiment of the invention.

FIG. 3 illustrates the wire crimping tool 10 having replaceable angled crimping portion 25 according to an embodiment invention. In this embodiment, the wire crimping tool 10 can be constructed and arranged to have replaceable angled crimping portion 25. The angled crimping portion 25 may include the first angled portion 18 and the second angled portion 20 as previously described. The tool 10 can include various angled crimping portions 25 (A-D) each having different angles.

The first angled portion 18 may in this embodiment may be flat or angled and may be split into two pieces, a first piece 58 integral with the angled crimping portion and a second piece 66 integral to the bodies 11, 15. The first piece 58 and second piece 66 includes a fastener receiving portion 60 that receives a threaded portion of a bolt 52. The bolt 52 secures the angled crimping portion 25 to the tool 10 when coupled with nut 56. Optionally, there may be a washer positioned between the nut and the bolt for better coupling. Although a bolt and nut are discussed herein, the angled crimped portion may be friction fit with the crimping tool 10 or other fastening means can be used such as a screw, magnets, adhesive, and rivets.

In one embodiment, the first and second pieces 58 and 66 are coupled together by being next to each other. In another embodiment, the first piece 58 can be received within the second piece 66 or vice versa.

Figure 4:
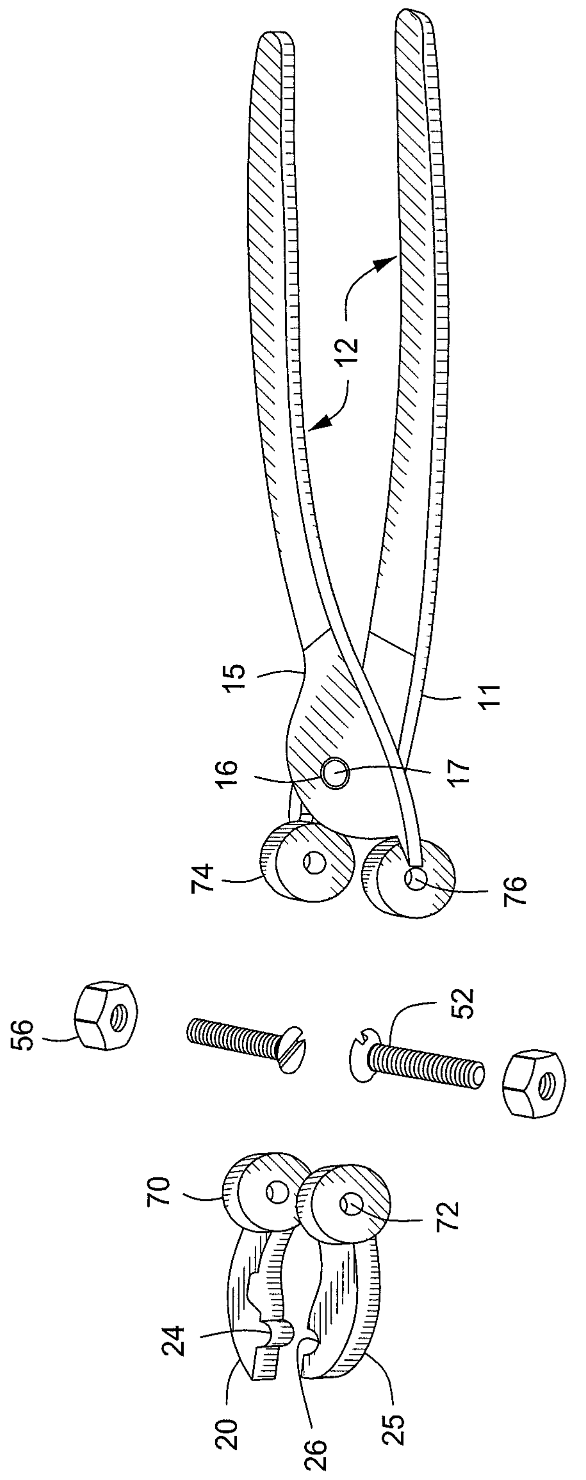
FIG. 4 illustrates the wire crimping tool having an adjustable angled crimping portion.

FIG. 4 illustrates the wire crimping tool 10 having movable angled crimping portion 25. In this embodiment, the wire crimping tool 10 can be constructed and arranged to have adjustable angled crimping portion 25 including the ones shown as A-D in FIG. 3. The angled crimping portion 25 includes a first attachment portion 70 at an end. A first fastener receiving portion 72 is located in the middle of the first attachment portion 70. A complementary second attachment portion 74 is located at an end of the bodies 11, 15. The second attachment portion 74 includes a second fastener receiving portion 76. Once the first and second attachment portions 70, 74 are coupled and the first and second fastener receiving portions 72, 74 are aligned with each other, then bolt 52 can be inserted into the first and second fastener receiving portions and secured with the nut 56. In some embodiments, the nut can be a wing nut for easy adjustment of the angled crimping portion 25. As an example, the wing nut can be rotated in a first direction to loosen its connection with the bolt, thereby, allowing the angle of the angled crimping portion to be adjusted by the user. Once the angled crimping portion is angled at the desired angle, then the wing nut can be rotated in a second direction to tighten its connection with the bolt, thereby, holding the angled crimping portion at the adjusted angle for use.

In this embodiment, the angled crimping portion 25 can be further angled at other angles. In other words, the angled crimping portion 25 can be manufactured at one angle, for example, 15 degrees and can further adjusted to further angles such as 30-90 degrees or any angle desired by the user. This way, the user can have any angle (of the angled crimping portion) desired to reach hard to reach places and have one crimping tool instead of many that fixed at various angles. This reduces costs to repair facilities.

In operation, the user can use the crimping tool to crimp electrical connectors at various angles. The crimping tool can be used to crimp wire terminals. The crimping tool can be manufactured with the angled crimping portion having fixed angles. The crimping tool can be manufactured with replaceable angled crimping portion having different angles. Alternatively, the crimping tool can be manufactured with adjustable angled crimping portion. With the crimping tools described herein, a user should be able to crimp connectors even at various angles that previously could not be reached with a straight crimping portion.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A crimping tool, comprising:

a first and second handle located at a first end of the crimping tool;

a pivoting portion coupling the first and second handles together, the handles pivoting about a pivot axis; and an angled crimping portion at a second end of the crimping tool, opposite the first end, the angled crimping portion formed to change from being in a plane substantially at a right angle with respect to the pivot axis toward a plane parallel to the pivot axis and is formed as being continuous with the first and second handles.

2. The tool of claim 1, wherein the angled crimping portion is removable from the crimping tool and replaceable.

3. The tool of claim 2, wherein the removable angled crimping portion is attached to the crimping tool with a nut and bolt to provide angled crimping portion of various angles relative to the pivoting portion.

4. The tool of claim 1, wherein the angled crimping portion's angle relative to the pivoting portion is further adjustable through the use of a means for coupling.

5. The tool of claim 1, further comprising a wire stripping portion located along a portion of the first and second handles.

6. The tool of claim 1, wherein the angled crimping portion includes a working portion to crimp an electrical connector.

7. The tool of claim 1, wherein the first and second handles include an elastomeric material indicative of an angle of the angled crimping portion.

8. The tool of claim 1, wherein the angled crimping portion further comprises a first and second portion having the same angle relative to the pivoting portion.

9. The tool of claim 1, wherein the angled crimping portion further comprises a first and second portion having different angles relative to each other.

10. A crimping tool, comprising:

a first and second means for gripping located at a first end of the crimping tool;

a means for pivoting configured to couple the first and second means for gripping together the first and second means for gripping pivoting about a pivot axis; and an angled means for crimping located at a second end of the crimping tool opposite the first end, the angled means for crimping is formed to change along its length from being in a plane substantially at a right angle with respect to the pivot axis towards a plane parallel with respect to the pivot axis and is formed as being continuous with the first and second means for gripping.

11. The tool of claim 10, wherein the angled means for crimping is removable from the crimping tool and replaceable.

12. The tool of claim 11, wherein the removable angled means for crimping is attached to the crimping tool with a nut and bolt to provide angled means for crimping of various angles relative to the means for pivoting.

13. The tool of claim 10, wherein the angled means for crimping's angle relative to the pivoting means is further adjustable through the use of a means for coupling.

14. The tool of claim 10, further comprising a means for stripping located at the first and second means for gripping.

15. The tool of claim 10, wherein the angled means for crimping includes a working portion to crimp an electrical connector.

16. The tool of claim 10, wherein the first and second means for gripping include an elastomeric material.

17. The tool of claim 10, wherein the angled means for crimping further comprises a first and second portion having the same angle relative to the means for pivoting.

18. The tool of claim 10, wherein the angled means for crimping further comprises a first and second portion having different angles relative to each other.

* * * * *